Figure 1:
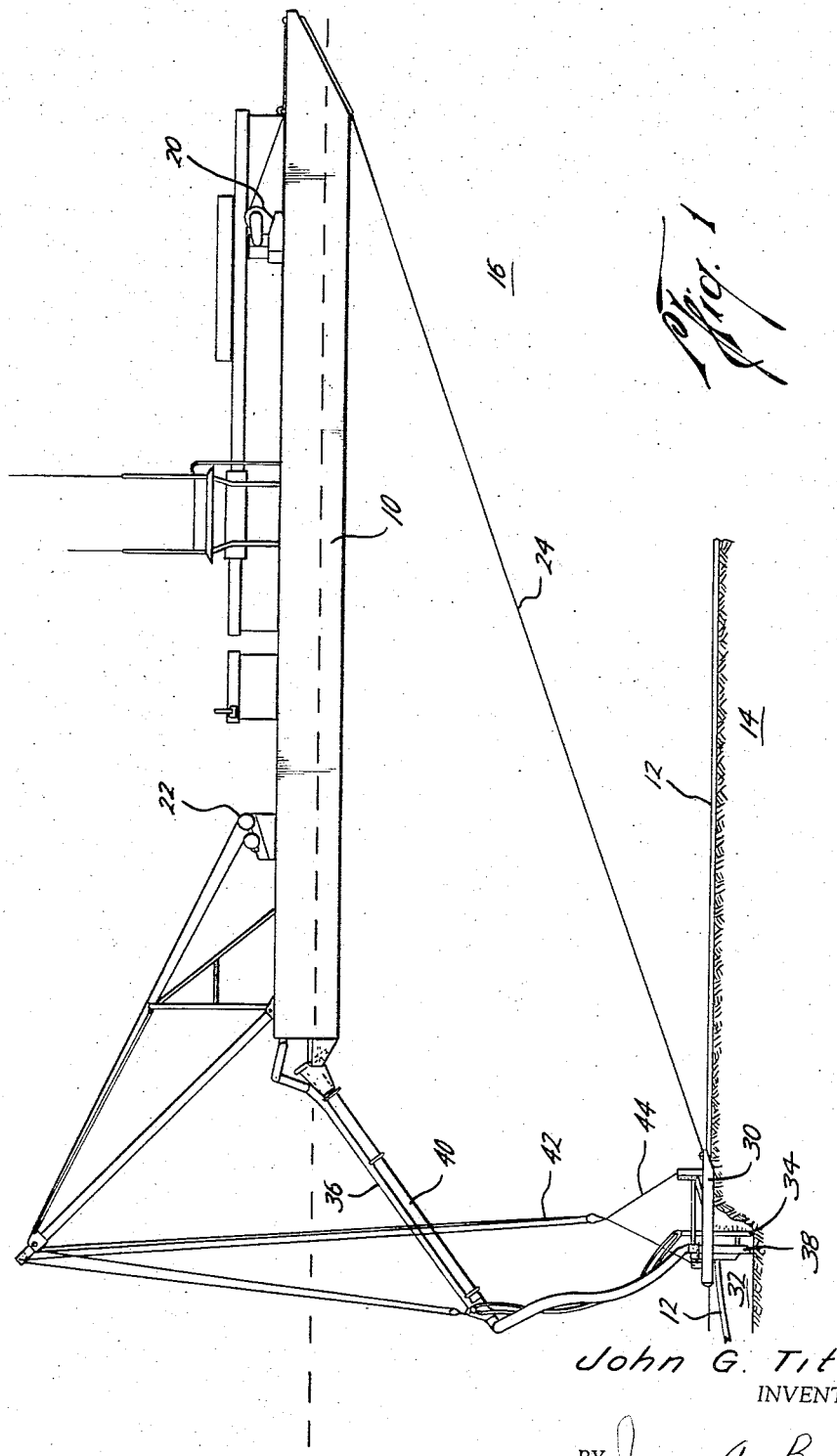

John G. Tittle
INVENTOR.

BY James A. Bargfrede

ATTORNEY

John G. Tittle
INVENTOR.

BY James A. Bargfrede

ATTORNEY

United States Patent Office 3,338,059
Patented Aug. 29, 1967

3,338,059
METHODS AND APPARATUS FOR ENTRENCHING SUBMERGED ELONGATE STRUCTURES
John G. Tittle, Pasadena, Tex., assignor to Brown & Root, Inc., Houston, Tex., a corporation of Texas
Filed Jan. 7, 1963, Ser. No. 249,626
8 Claims. (Cl. 61—72.4)

This invention pertains generally to pipe laying devices and particularly to a pipe laying device used in burying a pipeline which is on the floor of a body of water.

During recent years, increased activity in oil and gas exploration has taken place in various bodies of water, particularly in the Gulf of Mexico. Such increased activity has necessitated laying of tubular structures such as pipelines from the shore to the wells which have been drilled on the floor of a body of water. Because of the fact that laying a tubular structure such as pipe on the floor of the body of water presents unusual problems, unusual devices and methods have been developed in an attempt to effectively, economically, and efficiently lay pipe from the shore to the well or between wells. Prior to the present invention, various barge devices have been used for laying pipe along the floor of a body of water and subsequently forming a trench in the floor of the body of water below the pipe which had been layed. Typical apparatus utilized in burying a pipe line on the floor of a body of water is disclosed in U.S. Patent 2,755,632, issued July 24, 1956, to the assignee of the present invention.

Although known devices have been partially effective in positioning and burying a pipeline at a proper place on the floor of a body of water, such known devices have left much to be desired in the way of economy, simplicity, and reliability. Damage to the coating on the pipe must be avoided since water, particularly salt water will cause corrosion of the pipe at a rapid rate. Also, the pipe must be buried within the right-of-way boundaries and therefore accurate positioning and burying of the pipe may result in a decrease in easement costs. Underwater divers generally have been required for positioning various devices which have been used in providing trenches for the pipe on the floor of a body of water. At least two underwater divers have been required when known apparatus is used and the cost of two underwater divers has resulted in appreciable increase in the overall cost of laying and burying a pipeline in a body of water.

Thus, it is an object of the present invention to provide improved apparatus and methods for laying pipelines.

Another object of the present invention is to provide apparatus and methods which may be used in accurately burying a pipeline which has been laid on the floor of a body of water.

Another object of the present invention is to provide apparatus and methods which accurately provide an indication of the position of a pipeline relative to a sled device utilized in burying such pipeline on the floor of a body of water.

Yet another object of the present invention is to provide apparatus and methods which enable personnel on a floating vessel utilized in burying a pipeline to know the exact position of underwater apparatus relative to the pipeline so that proper measures may be taken to position such underwater apparatus whereby the pipeline will be buried within the limits of a right-of-way on the floor of a body of water.

Still a further object of the present invention is to provide apparatus and methods for positioning a device relative to a pipeline so that such pipeline may be buried along the floor of a body of water without damaging the coating on the pipeline and without the need for underwater personnel to locate and position the device relative to such pipeline.

Figure 2:
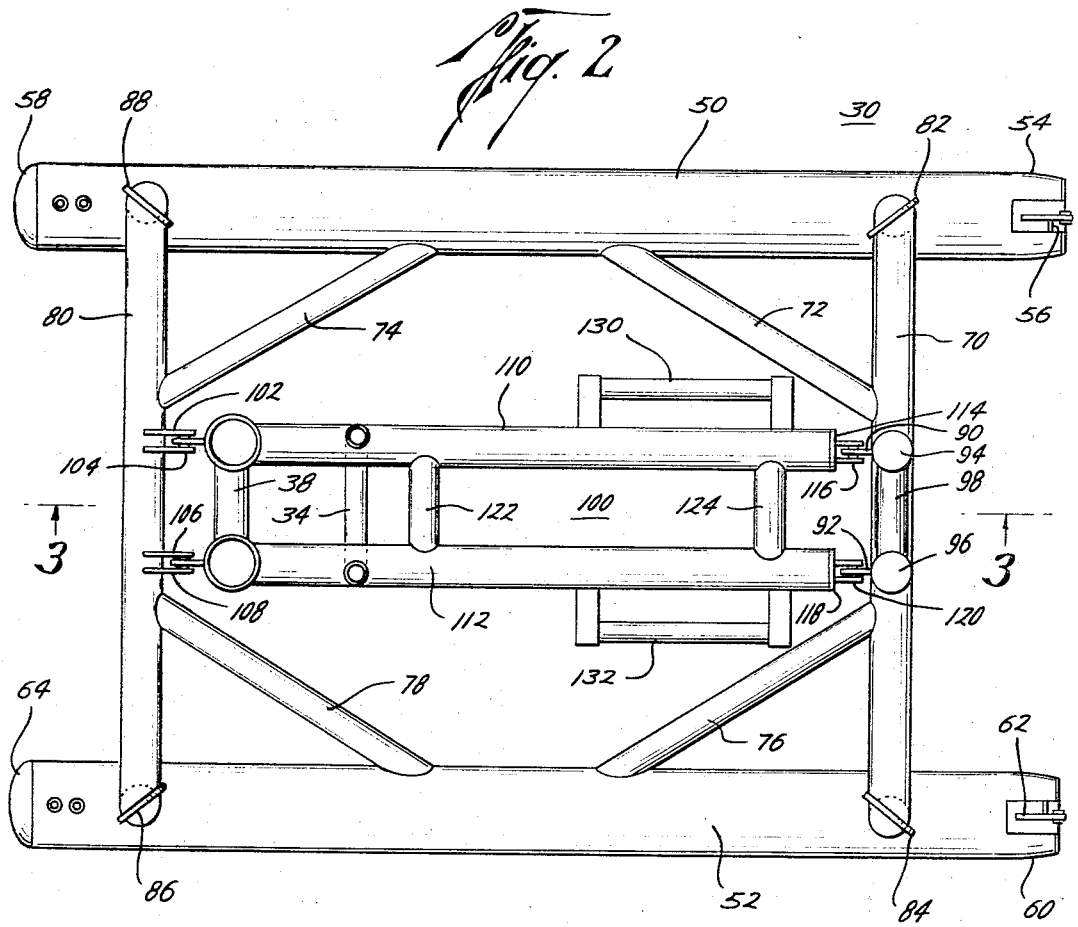
Figure 3:
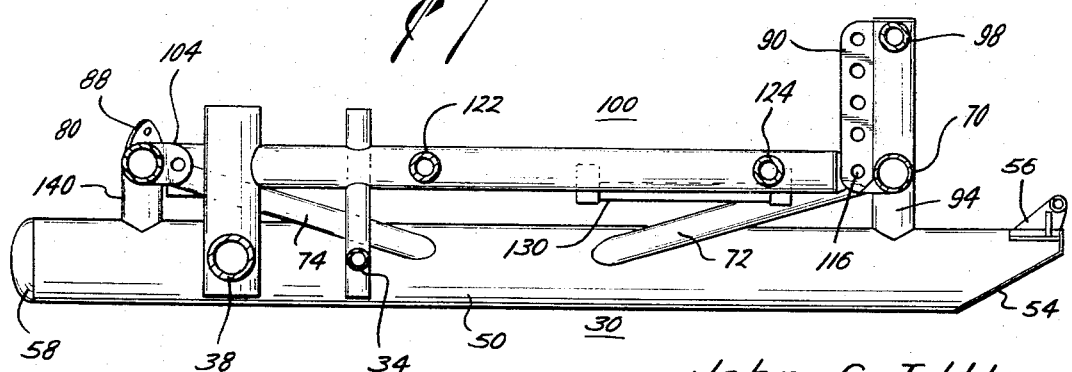
Figure 4:
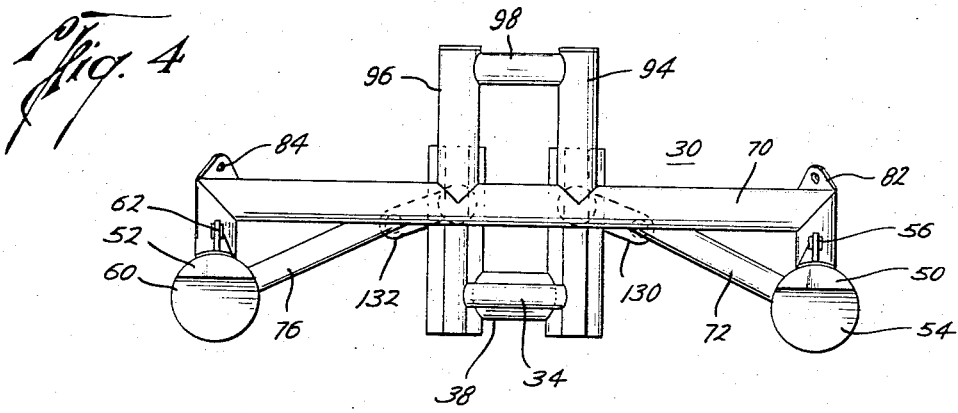
Figure 5:
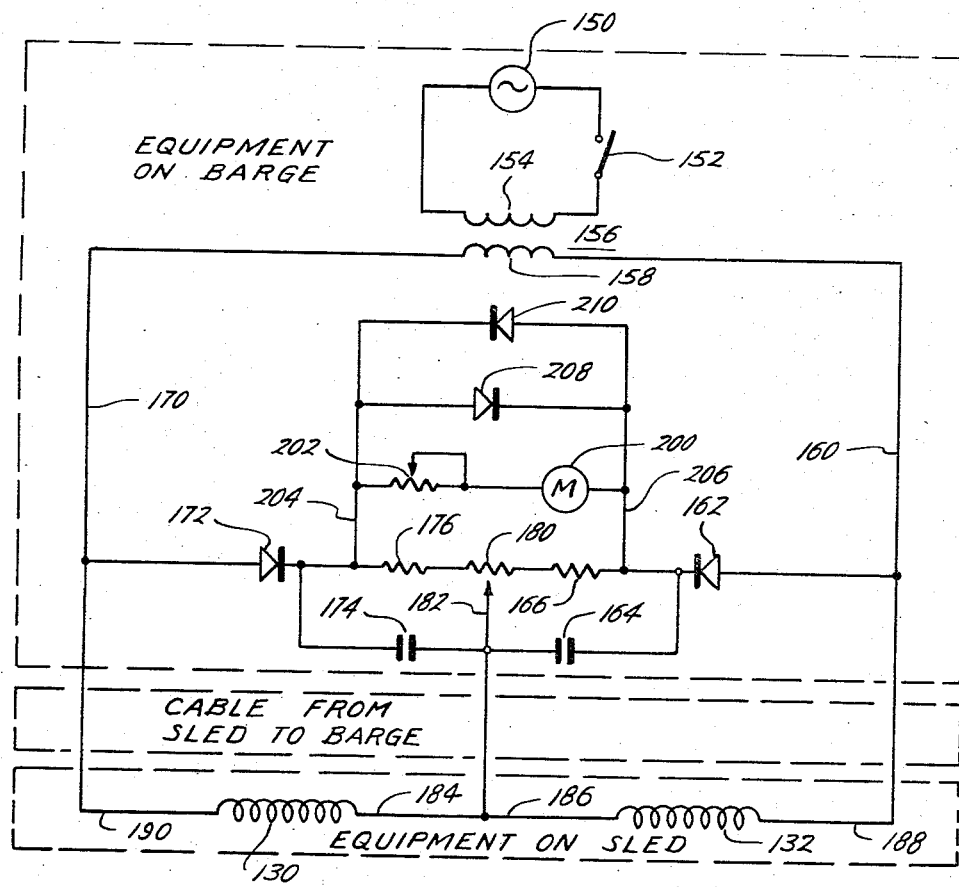

In the drawings,
FIGURE 1 is an elevational side view of pipeline burying apparatus incorporating the present invention;
FIGURE 2 is a plan top view of the underwater sled device utilized in the present invention;
FIGURE 3 is an elevational side view of the sled shown in FIGURE 2 taken along line 3—3;
FIGURE 4 is an elevational end view of the sled; and
FIGURE 5 is a schematic diagram of the circuit utilized in the present invention.

Briefly stated, the invention provides apparatus and methods for maintaining the proper position of a sled device relative to a pipeline which is to be buried on the floor of a body of water. Apparatus is provided for burying the pipeline within easement or right-of-way limits without damaging the pipeline coating and without requiring underwater personnel to communicate the position or location of the pipeline burying equipment to personnel who are on a floating vessel above the pipeline. The apparatus and methods of the present invention include utilization of impedance means such as inductors which form part of an electric circuit which includes the pipeline as a portion thereof. Such inductors provide a leakage inductance which is monitored through a balance circuit and variations of the balance circuit are noted on instruments positioned on the floating vessel. Appropriate corrective steps then are taken to insure that the pipeline will be properly buried in a trench provided on the floor of the body of water.

Referring now to the drawings in detail, FIGURE 1 is an elevational side view of a vessel 10 floating on a body of water 16. Vessel 10 is utilized in burying a tubular structure such as a pipeline 12 which has been laid on the floor 14 of the body of water 16. Vessel 10 may be of any suitable type including a barge which may be propelled from another vessel, or vessel 10 may be self-propelled by means which are not shown in FIGURE 1.

The structure and function of vessel 10 and its related apparatus will become apparent to those skilled in the art from a perusal of U.S. Patent 2,755,632, issued July 24, 1956. For purposes of explaining a preferred embodiment of the present invention, it is deemed sufficient to state that vessel 10 includes power winch means 20 disposed on the forward portion of vessel 10, and rear winch means 22 disposed on the aft or rear portion of vessel 10. Power means 20 has coupled thereto flexible means such as a cable 24 which is coupled to suitable device such as a sled 30. As will be explained in more detail subsequently, sled 30 is substantially free at the front end which is coupled to cable 24 while the aft or rear portion of sled 30 is substantially captive due to apparatus which is used in providing a trench 32 wherein pipeline 12 is to be positioned.

It will be apparent that proper positioning of sled 30 relative to the pipeline 12 is necessary so that trench 32 will be provided at the proper location. The proper positioning of the sled relative to the pipeline is a principal objective of the present invention. Discharge means 34 on sled 30 are coupled through coupling means 36 to the vessel 10. Discharge means 34 provide turbulence and agitation to the floor 14 and the agitated particles of floor 14 are drawn through suction means 38 coupled through coupling means 40 to the vessel 10. Thus, as sled 30 is pulled along floor 14 by power means 20, discharge means 34 and suction means 38 which are disposed on the rearward portion of sled 30 provide a trench 32 in which the pipe 12 is to be laid. Power means 22 coupled to suitable means such as a cable 42 are utilized for suspending the sled 30 from a support such as a bridle 44. It will be readily apparent to those skilled in the art that various types of pipe burying equipment may be utilized but the equipment just explained has been satisfactory.

It is further apparent that the position of the sled 30 relative to the pipeline 12 is of primary importance in properly laying the pipeline 12 in a trench 32 which is being provided along a specified right-of-way. The apparatus and methods of the present invention are directed to solving the problem of positioning the sled 30 at a proper location relative to the pipeline 12 without causing damage to the pipeline coating and without the need of having underwater divers working on the floor 14 during burying of the pipeline.

FIGURE 2 is a plan top view of the sled 30 shown in FIGURE 1. Sled 30 includes an outer member 50 and an outer member 52. Members 50 and 52 may be constructed of any suitable rigid material such as steel. The front portion of member 50 includes a plate 54 having attached thereto at its upper portion suitable coupling means 56. Coupling means 56 are used to couple the sled 30 to a cable which is wound on a spool on the floating vessel. The rear portion of member 50 has an elliptical head 58 suitably coupled thereto as by welding.

Similarly, member 52 includes a plate 60 having attached thereto coupling means 62. At the rear portion of member 52 is attached an elliptical head 64.

Coupled between members 50 and 52 is a front transverse member 70 and a rear transverse member 80. Members 70 and 80 may be tubular in structure and may be coupled to members 50 and 52 by suitable fastening means such as a weld. A first forward brace member 72 is coupled between member 70 and member 50 in a suitable manner such as by welding. First rear brace member 74 extends between member 80 and member 50. Second forward brace member 76 is positioned between member 70 and member 52 while second rear brace member 78 extends between member 80 and member 52. Suitable lifting lugs are provided at 82, 84, 86 and 88. These lifting lugs are utilized in suspending the sled from a cable support in the manner shown in FIGURE 1.

Disposed substantially in the central portion of members 70 and 80 are suitable means for positioning a structure generally identified as 100. The means disposed on member 70 include adjusting plates 90 and 92 which are coupled respectively to vertical members 94 and 96. Vertical members 94 and 96 are coupled together by a member 98. Member 80 is coupled to members 50 and 52 at the rear portions thereof and member 80 has coupled thereto brackets 102 and 104 near the juncture of member 80 and brace 74. Brackets 106 and 108 are coupled to member 80 near its juncture with brace 78.

Structure 100 is disposed intermediate transverse members 70 and 80. Structure 100 includes longitudinal members 110 and 112 which may be constructed of tubular steel. The front end of member 110 has a coupling member 114 attached thereto adapted for positioning near plate 90. Means 116 such as a rivet are used for coupling the plate 90 to coupling means 114. Likewise, member 112 has coupling means 118 attached to the front end thereof for positioning near plate 92. Means 120 are used to hold the coupling means 118 to plate 92.

Coupled to the rear portion of members 110 and 112 are structures 34 and 38 having vertical extensions as shown in FIGURE 1 for coupling to the vessel 10. The function of structures 34 and 38 has been explained previously and it is deemed unnecessary to give a detailed explanation of the structure or function of structures 34 and 38. Structures 34 and 38, however, are used to pivotally position the sled 30 on the floor of the body of water and structures 34 and 38 are used also to provide a trench in which the pipeline is laid. Members 110 and 112 have transverse members 122 and 124 coupled therebetween to brace the members 110 and 112. Members 122 and 124 may be constructed from suitable material such as tubular steel. A coil structure 130 may be coupled to member 110 and a coil structure 132 may be coupled to member 112. Coils 130 and 132 may be constructed of #24 AWG wire. The number of turns of wire and the physical dimensions of the coils may vary according to the particular utilization which is required. However, any coil arrangement which provided inductance will be satisfactory. It is conceivable that impedance means other than inductors might be used in practicing the present invention and therefore it is to be understood that impedance means include inductor means such as the coil structures just described. The functioning of coil structures 130 and 132 will be explained in detail subsequently in connection with FIGURE 5 of the present invention.

FIGURE 3 is an elevational side view of sled 30 taken along line 3—3 of FIGURE 2. FIGURE 3 shows one vertical member 140 coupled between member 150 and member 80. A similar vertical member is coupled between member 80 and member 52 but such vertical member is not shown in FIGURE 3. Member 94 is coupled between member 70 and member 98. It will be apparent that plate 90 has a plurality of holes therein to allow positioning of structure 100. The positioning of structure 100 has an effect on the leakage inductance provided between the coil structures and the pipe. Such leakage inductance will be explained in detail subsequently in connection with FIGURE 5 of the present invention.

FIGURE 4 is a plan end view of sled 30. Inductors 130 and 132 may be seen positioned substantially in the central portion of the sled 30. Each of the members or elements shown in FIGURE 4 have been explained previously and therefore further explanation of FIGURE 4 is thought to be unnecessary.

FIGURE 5 is a schematic diagram of the circuit utilized in practicing the present invention. The circuit diagram of FIGURE 5 is shown as being broken down into three sections. These three sections show the portion of the circuit utilized on the barge or floating vessel 10, the cable connections from the barge or floating vessel to the sled, and the circuit components which are positioned on the sled. A suitable source of alternating current electric power 150 is coupled through a switch 152 to the primary winding 154 of a buffer transformer 156. One end of secondary winding 158 of buffer transformer 156 is coupled through lead 160 to a rectifier and filter network which includes rectifier 162, capacitor 164 and resistor 166. The other end of secondary winding 158 is coupled through lead 170 to another rectifier and filter network which includes rectifier 172, capacitor 174, and resistor 176. A rheostat 180 is coupled as shown between resistors 166 and 176. The center tap of rheostat 180 is coupled through lead 182 to capacitors 174 and 164. Lead 184 from coil or inductor 130 is coupled to the center tap lead 182 and lead 186 is coupled from coil or inductor 132 to the center tap lead 182. Lead 188 from inductor 132 is coupled to lead 160 and lead 190 from inductor 130 is coupled to lead 170.

Suitable indicating means or measuring means include a meter 200 which is coupled in series with an adjustable resistor 202. The series combination of meter 200 and variable resistor 202 is coupled through leads 204 and 206 to resistor 176 between rectifier 172 and to resistor 166 between rectifier 162 as shown in the circuit diagram. Shunt coupled across the meter 200 and variable resistor 202 combination are oppositely poled rectifiers 208 and 210.

Thus, as shown in FIGURE 5, the only circuit components which are required to be on sled 30 are inductors 130 and 132. These inductors are coupled through suitable connections such as a cable to the other elements of the circuit.

When switch 152 is in the closed position the electric power source 150 energizes the circuit through buffer transformer 158. Inductors 130 and 132 are disposed in spaced relationship to the pipeline on the floor of a body of water and when the circuit of the present invention is energized voltage is applied to the inductors 130 and 132. Variable resistor 202 is used as a sensitivity control for different pipe sizes which may be encountered while practicing the present invention. Rheostat 180 is used for balancing the circuit by obtaining a zero reading on meter 200 when the pipe is ideally disposed between the inductors. As will be appreciated from viewing FIGURE 2, as the distance between one inductor and the pipe increases, the leakage inductance increases, and the voltage across the particular inductor decreases. Thus, as the inductor 130 moves away from the pipe, for example, the leakage inductance of inductor 130 increases and the voltage across inductor 130 decreases. At the same time, inductor 132 moves closer to the pipe and therefore the leakage inductance decreases and the voltage across inductor 132 increases. The pre-set balance indicated on meter 200 is upset and the increase and decrease in voltage across the inductors 130 and 132 indicates the position of the inductors with respect to the pipe thereby allowing proper corrective measures to be taken to restore a balanced reading on meter 200.

Referring again to FIGURE 5, rectifiers 208 and 210, which are oppositely poled and shunt coupled across the combination of meter 200 and variable resistor 202, are used to protect meter 200 against high voltage surges. Rectifiers 208 and 210 provide bypassing of meter 200 whenever a voltage reading in excess of a predetermined amount which would damage meter 200 is obtained. Meter 200 may be a direct current meter having a zero center so that voltage readings are indicated on either side of a center zero marker. Other indicating or metering means are satisfactory, however, and may be used just as effectively as the meter arrangement just described.

The circuit elements of the present invention are relatively simple and inexpensive yet such elements are effective for indicating the position of the sled relative to the pipeline which is to be buried along the floor of a body of water. The meter readings or indications obtained by the circuit shown in FIGURE 5 eliminate the need of having underwater divers to periodically position the sled relative to the pipeline since the position of the sled relative to the pipeline is known from the meter readings or indications. When the pipeline location with respect to the sled is known, appropriate corrective measures may be taken as by positioning the floating vessel used in burying the pipeline.

Thus, the present invention provides apparatus and methods for maintaining the position of a sled device relative to a pipeline on the floor of a body of water without damaging the coating on the pipeline and without having underwater divers performing extensive work on the floor of the body of water. The apparatus of the present invention is relatively simple, inexpensive, and effective. The invention may be used in instances where different diameters of pipe are being buried and the present invention is effective in shallow water as well as in deep water.

Although a preferred embodiment of the present invention has been shown and described, it will be apparent to those skilled in the art that many modifications and refinements can be made without departing from the spirit of the invention. The invention is defined by the following claims and although such claims may be presented in indented format to facilitate reading and understanding thereof, such indented format is not to be construed as a structural or functional limitation of the elements or steps recited in such claims.

I claim:
1. An apparatus for entrenching submerged elongate means, said apparatus comprising:
   a floating vessel;
   a submerged vehicle;
   means connecting said submerged vehicle with said vessel whereby movement of said vessel induces movement of said vehicle;
   elongate means on a submerged surface;
   said vehicle being disposed adjacent, but movable vertically and laterally of, said elongate means;
   a first portion of said vehicle disposed on one side of a vertical plane extending longitudinally through said elongate means;
   a second portion of said vehicle disposed on an opposite side of said plane;
   first proximity detecting means carried by said first portion of said vehicle and operable independent of optical means to determine the proximity of said first portion of said vehicle to said one side of said plane;
   second proximity detecting means carried by said second portion of said vehicle and operable independent of optical means to determine the proximity of said second portion of said vehicle to said opposite side of said plane, said first and second detecting means being spaced laterally on opposite sides of said vertical plane;
   trench forming means carried by said vehicle and adapted to straddle said elongate means and form a trench opening downwardly from said submerged surface to receive said elongate means as said vehicle is moved generally longitudinally of said elongate means; and
   indicating means on said vessel responsive to the operation of said first and second detecting means to provide an indication of the proximity of said first and second vehicle portions to said one and said opposite sides of said plane.

2. An apparatus as described in claim 1 wherein said trench forming means includes:
   first discharge means carried by said vehicle on said one side of said plane and adapted to agitate material comprising said submerged surface on said one side of said plane;
   second discharge means carried by said vehicle on said opposite side of said plane and adapted to agitate material comprising said submerged surface on said opposite side of said plane;
   first suction means disposed on said one side of said plane and adapted to draw away said agitated material; and
   second suction means disposed on said opposite side of said plane and adapted to draw away said agitated material.

3. An apparatus as described in claim 2:
wherein said means connecting said vehicle to said vessel comprises:
   flexible cable means extending downwardly from the front of said vessel to the front of said vehicle;
   coupling means extending from the rear of said vessel to a rear portion of said vehicle and enabling the front portion of said vehicle to pivot laterally about an axis disposed rearwardly of the center of said vehicle; and
wherein said first and second detecting means are disposed between said coupling means and the front of said vehicle.

4. An apparatus as described in claim 3:
wherein said first and second detecting means each includes
   inductance means, and
   energizing means coupled to said inductance means for energizing the same; and
wherein said indicating means on said vessel includes
   measuring means coupled to said inductance means of said first and second detecting means for measuring the inductance between said inductance means and said elongate means.

5. A method for entrenching submerged elongate means, said method comprising:
  providing a floating vessel;
  providing a submerged vehicle connected with said vessel whereby movement of said vessel induces movement of said vehicle;
  disposing said vehicle adjacent, but movable vertically and laterally of, elongate means on a submerged surface with said vehicle straddling said elongate means and a first portion of said vehicle being disposed on one side of a vertical plane extending longitudinally through said elongate means and a second portion of said vehicle being disposed on an opposite side of said plane;
  providing first detecting means spaced laterally on one side of said plane for detecting from said vehicle, independent of optical means, the proximity of said first portion of said vehicle to said one side of said plane;
  providing second detecting means spaced laterally on an opposite side of said vertical plane from said first detecting means for detecting from said vehicle, independent of optical means, the proximity of said second portion of said vehicle to said opposite side of said plane;
  forming a trench from said vehicle opening downwardly from said submerged surface to receive said elongate means as said vehicle is moved generally longitudinally of said elongate means;
  providing an indication, responsive to the proximity detection operation of said first and second detecting means, of the proximity of said first and second vehicle portions to said one and said opposite sides of said plane; and
  moving said vessel in accordance with said indications so as to maintain said submerged vehicle in a desired alignment with said elongate means.

6. A method as described in claim 5 wherein said trench is formed by:
  discharging fluid from said vehicle on said one side of said plane and so as to agitate material comprising said submerged surface on said one side of said plane;
  discharging fluid from said vehicle on said opposite side of said plane and so as to agitate material comprising said submerged surface on said opposite side of said plane;
  from said vehicle, drawing agitated material away from said one side of said plane; and
  from said vehicle, drawing agitated material away from said opposite side of said plane.

7. A method as described in claim 6:
  wherein said submerged vehicle is towed along said elongate means by flexible cable means extending downwardly from the front of said vessel to the front of said vehicle;
  wherein the rear of said vessel is coupled to a rear portion of said vehicle so as to enable the front portion of said vehicle to pivot laterally about an axis disposed rearwardly of the center of said vehicle; and
  wherein said first and second detecting means are disposed between said coupling means and the front of said vehicle.

8. A method as described in claim 7:
  wherein said first and second detecting means provide inductive fields between said first and second vehicle portions, respectively, and said elongate means; and
  wherein said vehicle is pivoted by said cable means about said axis in response to changes in said inductive fields resulting from changes in proximity of said first and second detecting means to said plane.

References Cited

UNITED STATES PATENTS

| | | | |
|---|---|---|---|
| 2,142,135 | 1/1939 | Lawton | 61—72.6 X |
| 2,238,072 | 4/1941 | Nelson et al. | 324—34 X |
| 2,339,291 | 1/1944 | Paulus et al. | |
| 2,355,086 | 8/1944 | Lang. | |
| 2,755,632 | 7/1956 | Hauber et al. | 61—72.4 |
| 2,901,676 | 8/1959 | Mittag. | |
| 2,957,127 | 10/1960 | Wright | 324—34 |
| 2,971,079 | 2/1961 | Sommeria. | |
| 3,020,470 | 2/1962 | Shawhan et al. | 324—3 |

EARL J. WITMER, *Primary Examiner.*

WALTER L. CARSON, *Examiner.*

G. R. STRECKER, *Assistant Examiner.*